(12) United States Patent
Jung et al.

(10) Patent No.: US 6,563,249 B1
(45) Date of Patent: May 13, 2003

(54) ROTARY MICROACTUATOR HAVING OPTIMALLY CURVED ELECTRODES

(75) Inventors: Sunghwan Jung, Anyang (KR); Jong Up Jeon, Suwon (KR); Jae-joon Choi, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 5 days.

(21) Appl. No.: 09/633,288

(22) Filed: Aug. 4, 2000

(30) Foreign Application Priority Data

Oct. 21, 1999 (KR) .......................................... 99-45855

(51) Int. Cl.[7] .................................................. H02N 1/00
(52) U.S. Cl. ..................................... 310/309; 73/504.12
(58) Field of Search ......................... 310/309; 73/504.12

(56) References Cited

U.S. PATENT DOCUMENTS 5,025,346 A * 6/1991 Tang et al. ................. 361/283
5,428,259 A * 6/1995 Suzuki ....................... 310/309
5,585,683 A * 12/1996 Higuchi et al. ............. 310/309
5,869,760 A   2/1999 Geen
5,959,808 A   9/1999 Fan et al.

FOREIGN PATENT DOCUMENTS

JP        6-339285    * 12/1994  ................. 310/309
JP      2001-162599   *  6/2001  ................. 310/309

* cited by examiner

Primary Examiner—Karl Tamai
(74) Attorney, Agent, or Firm—Burns Doane Swecker & Mathis, LLP

(57) ABSTRACT

A rotary microactuator having optimally curved electrodes is provided. The rotary microactuator is optimally designed so that the interval between two electrodes, which are a rotor and a stator, is constant regardless of a distance from the central axis of the rotor. Thus, a parallel-plate configuration can generate a maximum driving force, and also can widen a driving range. In particular, in a rotary microactuator using parallel-plate configuration electrodes, the electrodes are optimally designed so that the interval between the electrodes remains constant regardless the radius by tilting the electrodes or by zigzagging the electrodes. Therefore, a driving force per a given area can be maximized.

8 Claims, 11 Drawing Sheets

$g_n = g_o \cos\theta_t$

ROTARY MICROACTUATOR HAVING OPTIMALLY CURVED ELECTRODES

BACKGROUND OF THE INVENTION

1. Field of the Invention

The present invention relates to a rotary microactuator integrating optimally curved electrodes.

2. Description of the Related Art

Figure 1:
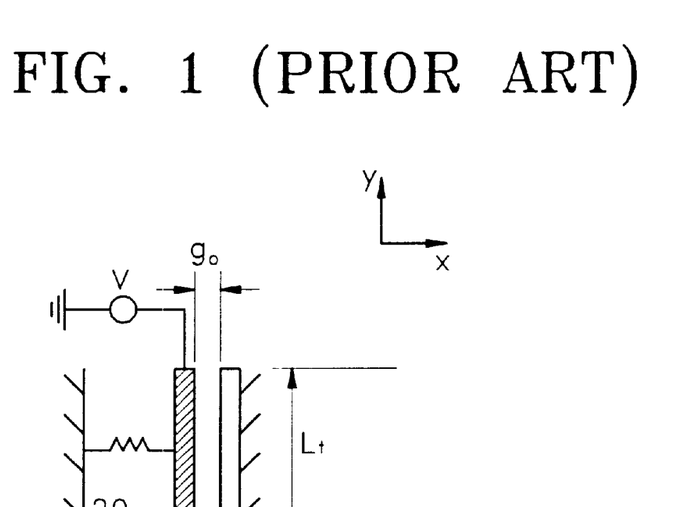
FIG. 1 illustrates the structure of a conventional linear microactuator in which stators and rotors are aligned perpendicularly to the driving direction at regular intervals.
Figure 2:
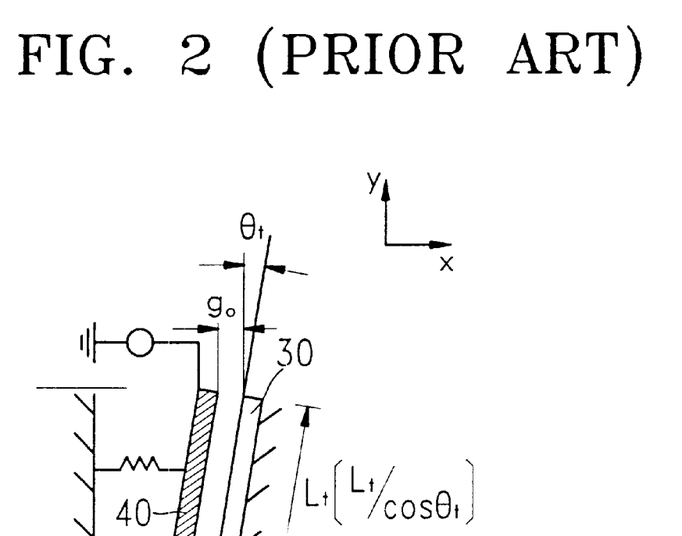
FIG. 2 illustrates the structure of another conventional linear microactuator in which a stator and a rotor are tilt by et from a direction perpendicular to the driving direction.

FIGS. 1 and 2 illustrate the driving principle of conventional linear microactuators. A linear microactuator of a type shown in FIG. 1 has a structure in which a stator 10 and a rotor 20 are aligned at regular intervals $g_0$. On the other hand, a linear microactuator of a type shown in FIG. 2 has a stator 30 and a rotor 40 which are tilted by $\theta_t$ from a direction perpendicular to the driving direction in a transverse mode. The electrode structure of this type of microactuator is disclosed in Electronics Letters, 1998, Vol. 34, No. 18, pp 1787–1788.

Figure 3:
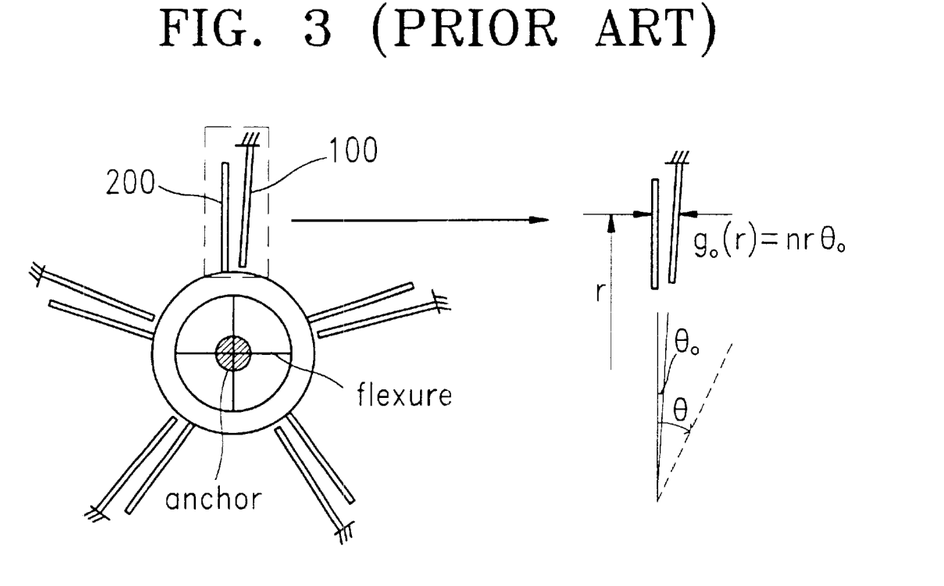
FIG. 3 is a view for illustrating the basic principle of operation of a conventional rotary microactuator.

FIG. 3 is a view for illustrating the basic operating principle of a rotatory microactuator. The driving method of a rotary electrostatic microactuator includes methods of two types: an interdigited configuration (another name is a comb-type) type; and a parallel-plate configuration electrode type. A force generated in the case of the interdigited configuration type is inversely proportional to the interval between two electrodes, but a force generated in the case of the parallel-plate configuration electrode type is inversely proportional to the square of the interval between two electrodes. Thus, as the interval between electrodes becomes narrower, the parallel-plate configuration electrode type has a greater driving force than the driving force of the interdigited configuration type. Due to the continuous development of new process techniques, the interval between two electrodes is being reduced. Hence, in the future, it is estimated that the merits of parallel-plate electrode type rotary electrostatic microactuators will be more highlighted. In order to meet this trend, techniques of maximizing the driving force of the conventional parallel-plate electrode by focusing on the parallel-plate electrode must be developed.

A rotary microactuator using such a parallel-plate electrode is actually disclosed in Journal Microelectromechanical systems, pp 141–148, Vol. 7, No. 2, June 1998. As shown in FIG. 3, a conventional rotary microactuator has a structure in which two parallel-plate configuration electrodes, that is, a stator 100 and a rotor 200, are aligned perpendicularly to the direction of driving (rotation). In this rotary microactuator, the gap between the electrodes becomes wider in the direction of the outside. Since the driving distance is proportional to the radius, the interval between two electrodes must be increased in the direction toward the outside. Also, when a large displacement is required, the interval between electrodes in initial state before a voltage is applied must be wide, so that the interval between electrodes must be wide. Therefore, the merit of a parallel-plate electrode in that a large driving force can be generated when the gap between electrodes is narrow, is not sufficiently employed.

SUMMARY OF THE INVENTION

To solve the above problem, an objective of the present invention is to provide a rotary microactuator by which parallel-plate configuration electrodes can generate a maximum driving force by designing electrodes so that the vertical interval between electrodes is uniformly maintained to a minimum interval that can be obtained during the electrode manufacturing process regardless of an arbitrary radius of an electrode between the inner radius and the outer radius.

To achieve the above objective, the present invention provides a rotary microactuator having a rotor and a stator optimally-shaped plate electrodes for driving rotation, wherein the rotor and the stator have a tangent tilting angle which continuously varies according to a radius from the central axis of the rotor so that the interval between the rotor and the stator in the normal direction to the curvature of the rotor and stator is constant regardless of a radius from the central axis of the rotor, in order to generate a maximum rotation driving force.

Preferably, the tangent tilting angle $\theta_t(r,g_f)$ depending on the radius r is expressed as in the following Equation:

$$\theta_t(r, g_f) = \cos^{-1}\left(\frac{g_f}{nr\theta_0}\right),$$

when in the manufacture of the rotor and the stator, the minimum interval between the two electrodes that can be obtained by a process is set to be $g_f$, a driving angle required by the actuator is set to be $\theta_0$, a factor for satisfying the static stability of the two electrodes within an electrical field is set to be n, and the radius is set to be r. It is also preferable that an electrode position angle $\theta_e(r^*)$ formed by the axis of an electrode position radius $r^*$ from the axis of the inner radius $r_1$ at which an electrode begins is expressed as in the following Equation:

$$\theta_e(r^*) = \int_{rl}^{r^*} \frac{\tan\left(\cos^{-1}\left(\frac{g_f}{r\theta_0}\right)\right)}{r} dr$$

wherein n denotes a factor for satisfying the static stability of the two electrodes within an electrical field, $r_1$ denotes the inner radius of the rotor, which is the distance to the innermost portions of the two electrodes, $r_2$ denotes the outer radius of the rotor, which is the distance to the outermost portions of the two electrodes, $\theta_0$ denotes a driving angle required by the actuator between the inner radius and the outer radius, and $r^*$ denotes an electrode position radius from the central axis of the rotor to an arbitrary point on each of the two electrodes within the required driving angle $\theta_0$.

To achieve the above objective, the present invention provides another type of a rotary microactuator including a rotor and a stator as optimally-shaped plate electrodes for driving rotation, wherein the rotor and the stator have a zigzag shape so that the interval between the rotor and the stator in the normal direction is constant regardless of a distance from the central axis of the rotor, in order to generate the same maximum rotation driving force as that of the firstly-introduced rotary microactuator.

In the rotary microactuator, preferably, the rotor and the stator are zigzagged more sharply in the direction of the outer radius of the rotor, so that the width of each piece in the circumferential direction is constant. However, it is preferable that each zigzagged piece of the rotor and the stator has a continuous tilting angle along the radius from the central axis of the rotor. In order to achieve this, the tangent tilting angle $\theta_t(r,g_f)$ with respect to the axis of the radius r is expressed as in the following Equation:

$$\theta_t(r, g_f) = \cos^{-1}\left(\frac{g_f}{nr\theta_0}\right),$$

when in the manufacture of pieces from the zigzagged rotor and the zigzagged stator, the minimum interval between the two electrodes that can be obtained by a process is set to be $g_f$, a driving angle required by the actuator is set to be $\theta_0$, a factor for satisfying the static stability of the two electrodes within an electrical field is set to be n, and the radius is set to be r. The zigzag shape switches the tilting direction alternatively, one for clockwise and the other for counter-clockwise while the magnitude of the tilting angle adopts the one given by Equation:

$$\theta_t(r, g_f) = \cos^{-1}\left(\frac{g_f}{nr\theta_0}\right).$$

BRIEF DESCRIPTION OF THE DRAWINGS

The above objective and advantage of the present invention will become more apparent by describing in detail preferred embodiments thereof with reference to the attached drawings in which:

FIGS. 1 and 2 are views for illustrating the driving principles of conventional linear microactuators, wherein

FIGS. 6 through 13 illustrate another embodiment of the present invention,

DESCRIPTION OF THE PREFERRED EMBODIMENTS

A rotary microactuator according to the present invention proposes the effect of the tilting angle of an electrode in a transverse mode electrostatic microactuator, and then applies this effect to a rotary microactuator in association with process techniques, thereby maximizing a driving force. That is, the rotary microactuator according to the present invention is essentially characterized in that, as shown in FIG. 2, a stator 30 and rotor 40 are tilted by $\theta_t$ from a direction perpendicular to the driving direction in a transverse mode. The principle of installing at an angle a rotor and a stator in a rotary microactuator will now be described in detail.

First, the principle of operation of a tilted stator and rotor in a linear microactuator of a type as shown in FIG. 2, will be described. Then, the principle will be applied to a rotary microactuator.

In the linear microactuator of FIG. 2, when the driving direction is set to be a direction indicated by arrow x, the initial interval between electrodes in the direction x is set to be a multiple of a driving scope by n as shown in Equation 1, in order to achieve stable driving:

$$g_0 \times nx_0 \tag{1}$$

wherein $x_0$ denotes the driving distance which is required by an actuator. In the case of parallel-plate configuration electrodes, 3 is substituted for n. In FIG. 2, $g_o$ denotes the interval between electrodes in the driving direction, and $g_n$ denotes the vertical interval between the stator 30 and the rotor 40. The difference in driving force will now be described.

In the two cases of the microactuator (first type) shown in FIG. 1 ($g_0$ is equally given to the first type for achieving the same stable operating range as the actuator of FIG. 2) and the microactuator (second type) shown in FIG. 2, for an accurate comparison of the difference in driving force, the height of the electrodes in a direction y perpendicular to the driving direction is set to be the same, $L_t$. Since the driving force must be applied in the same direction as the driving direction, a force in the direction x is calculated.

The driving force $F_1$ of the first type microactuator is shown in Equation 2:

$$F_1 = \frac{\varepsilon_0 h V^2 L_t}{(g_0)^2} \tag{2}$$

wherein h is the height of a parallel plate, $\varepsilon_0$ denotes permittivity, and V denotes driving voltage.

The driving force $F_2$ of the second type microactuator is shown in Equation 3:

$$F_2 = \frac{\varepsilon_0 h V^2 L_t}{(g_n)^2} = \frac{\varepsilon_0 h V^2 L_t}{(g_0 \cos\theta_t)^2} \tag{3}$$

Accordingly, the ratio of the driving force $F_1$ of the first type microactuator to the driving force $F_2$ of the second type microactuator is obtained as shown in Equation 4:

$$\frac{F_2}{F_1} = \frac{1}{\cos^2\theta_t} \tag{4}$$

As can be seen from Equation 4, the force of the second type microactuator becomes greater than the force of the first type microactuator as the tilting angle increases. Note that the operating range is equally given for both types. That is, an increase in tilting angle reduces the interval between the two electrodes, thereby increasing the driving force without any reduction in stable operating range. Therefore, it is estimated that the driving force is increased without limitation by continuously increasing the tilting angle. However, as for the interval between electrodes, i.e., the vertical distance between two electrodes, there is a minimum interval that can be obtained by a process. Accordingly, a maximum driving force is determined as shown in Equation 5, due to limits associated with the process:

$$F_2 = \frac{\varepsilon_0 h V^2 L_t}{g_f^2} \quad (5)$$

wherein $g_f$ denotes a minimum interval between electrodes that can be obtained by a process. At this time, the tilting angle $\theta_t(r)$ is determined as shown in Equation 6:

$$\theta_t(r) = \cos^{-1}\left(\frac{g_f}{nx_0}\right), \quad \frac{g_f}{nx_0} < 1 \quad (6)$$

$$\theta_1 = 0 \quad \frac{g_f}{nx_0} \geq 1$$

Merits that can be obtained when such an operation principle is applied to a rotary microactuator, will now be described.

First, the design of rotary microactuators according to a conventional fundamental concept, which is disclosed in Journal of Microelectromechanical systems, Vol 7, No. 2, pp 141–148, June 1998, will be described. FIG. 3 shows a rotary microactuator designed according to the conventional concept. That is, the rotary microactuator has a radially symmetrical structure.

Given that a driving angle required by the actuator is $\theta_0$, and the driving distance (the direction indicated by $\theta$) required at the position of an arbitrary radius r from the center (i.e., the central axis of a rotor) is set to be $x_0$, $x_0$ is determined as shown in Equation 7:

$$x_0 = r\theta_0 \quad (7)$$

The initial interval $g_o$ in the driving direction (direction indicated by $\theta$) is determined as shown in Equation 8, in order to meet the driving stability as mentioned above:

$$g_0 = nr\theta_0 \quad (8)$$

When a torque (T) from the center of rotation is calculated using a differential element having a length of $\Delta r$ selected at the position of an arbitrary radius r, it is similar to a force that can be generated by the first type microactuator in the transverse mode, as shown in Equation 9:

$$\Delta T_1 = \frac{\varepsilon_0 h V^2 r}{(g_0)^2} \Delta r \quad (9)$$

wherein $g_0$ denotes the interval between two electrodes in the driving direction upon driving.

Figure 4:
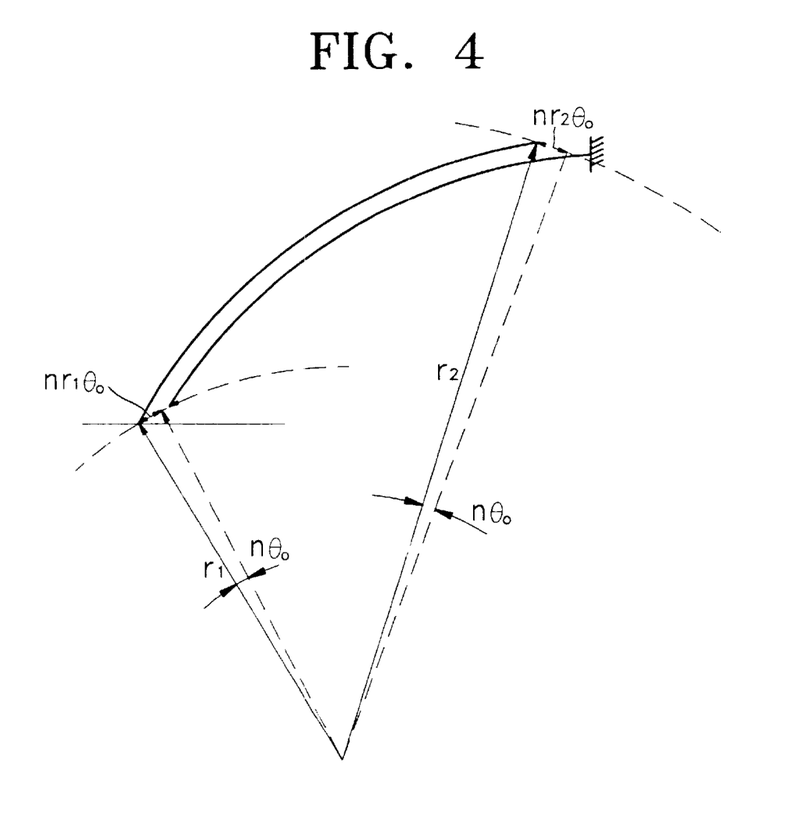
FIG. 4 is a view for illustrating the principle of operation of a rotary microactuator according to the present invention.

The microactuator according to the present invention adopts the tilting concept of the second type microactuator in the transverse mode. As shown in FIG. 4, when the minimum interval between electrodes that can be obtained upon a process is $g_f$, a tangent tilting angle required with respect to a radial direction to generate a maximum torque in a section where the length of an electrode is $\Delta r$ is calculated as shown in Equation 10:

$$\theta_t(r, g_f) = \cos^{-1}\left(\frac{g_f}{nx_0}\right) = \cos^{-1}\left(\frac{g_f}{nr\theta_0}\right), \quad \frac{g_f}{nr\theta_0} < 1 \quad (10)$$

$$\theta_t(r, g_f) = 0 \quad \frac{g_f}{nr\theta_0} \geq 1$$

wherein $g_f$ denotes the minimum interval between two electrodes (a rotor and a stator) that can be obtained by a process, $\theta_0$ is a driving angle which is required by an actuator, n is a factor for satisfying the static stability of a structure (a rotor and a stator) within an electrical field, r is a radius, and $\theta_t(r,g_f)$ denotes the tangent tilting angle depending on the radius r. However, when the argument of the above cosine inverse function is greater than 1, the tilting angle $\theta_t$ is 0°. When the tilting angle which continuously changes according to the radius as shown in Equation 10 is applied, a torque generated by selecting a differential element which exists in a section where the length of an electrode is $\Delta r$ is calculated as shown in Equation 11:

$$\Delta T_2 = \frac{\varepsilon_0 h V^2 r}{(g_f)^2} \Delta r \quad (11)$$

The relative ratio of the driving power in Equation 11 to the driving power in Equation 9 is the same as the ratio shown in Equation 4. If the shape of an electrode is optimally designed by continuously changing the tangent tilting angle of an electrode with respect to each radius from the center of rotation, a maximum driving force can be generated. An optimal design of two electrodes is shown in FIG. 4. Referring to FIG. 4, the interval between electrodes in the driving direction becomes wider as the radius increases, but the vertical distance between electrodes is maintained constant regardless of a radius. When an electrode position angle $\theta_e(r^*)$ is expressed with $r^*$ which denotes the distance from a starting point to an arbitrary point on an electrode when the center of rotation is taken as the center of a cylindrical coordinate system, it can be expressed as in Equation 12:

$$\theta_e(r^*) = \int_{r1}^{r^*} \frac{\tan\left(\cos^{-1}\left(\frac{x_0}{r\theta_0}\right)\right)}{r} dr \quad (12)$$

wherein the electrode position angle $\theta_e(r^*)$ is defined as an angle that a radial axis $r^*$, which passes by an arbitrary point on an electrode, makes with respect to a radial axis (inner radius $r_1$), which passes by the starting point of an electrode.

Figure 5:
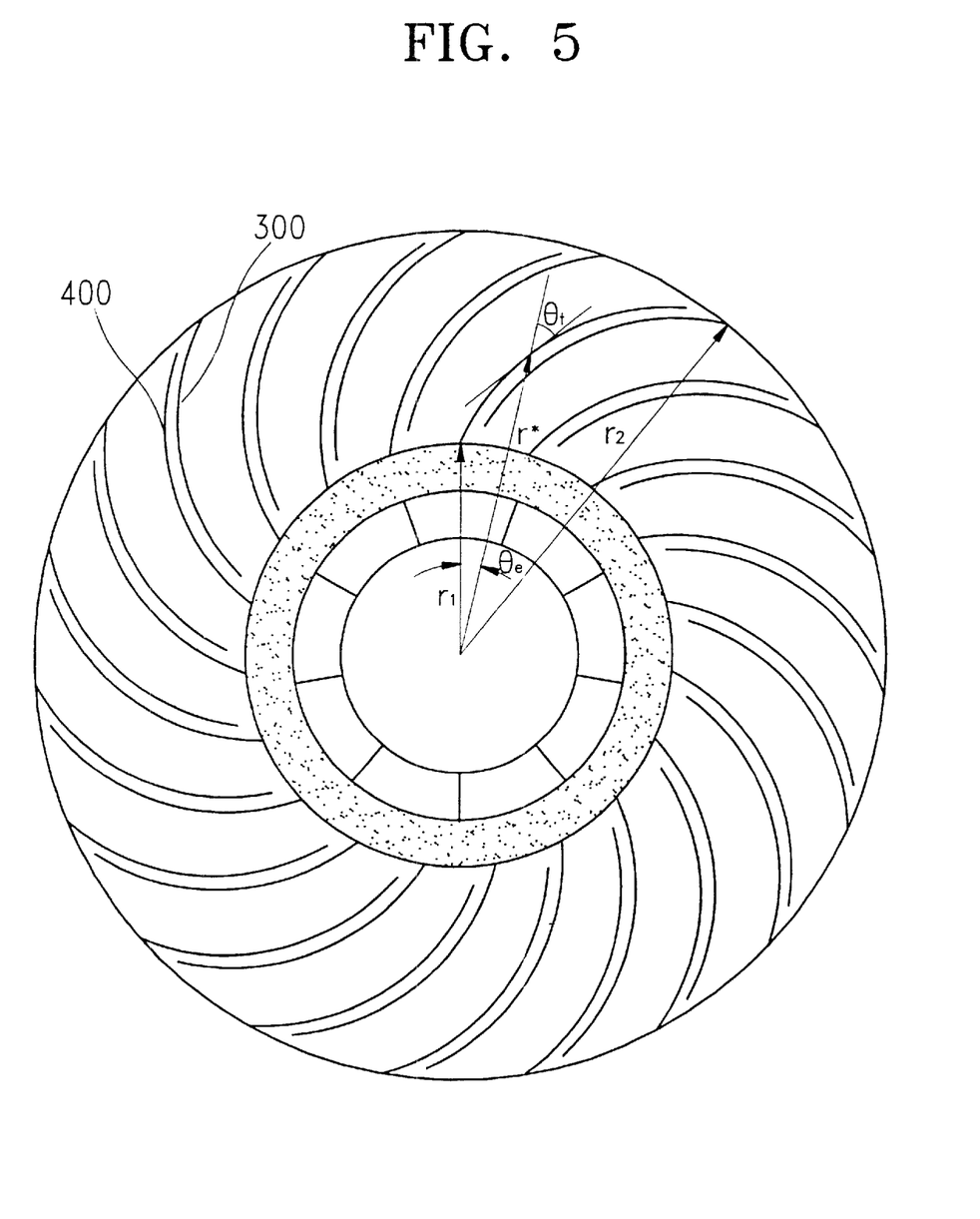
FIG. 5 is a view for illustrating the structure of a rotary microactuator with a rotor and a stator, which is manufactured so that the principle of operation illustrated in FIG. 4 is applied.

The relative ratio of the total driving force when the tangent tilting angle is continuously changed as shown in FIG. 4 and the total driving force T1 when electrodes are arranged perpendicularly to the driving direction as shown in FIG. 3 (i.e., when the tangent tilting angle is always 0°), is expressed as in Equation 13:

$$\frac{T_2}{T_1} = \frac{\int_{r1}^{r2} \Delta T_2}{\int_{r1}^{r2} \Delta T_1} = \frac{\frac{\varepsilon_0 h V^2 (r_2^2 - r_1^2)}{2(g_f)^2}}{\frac{\varepsilon_0 h V^2 \ln\left(\frac{r_2}{r_1}\right)}{\theta_0}} \quad (13)$$

wherein $r_2$ is the outer radius of an electrode, and $r_1$ is the inner radius of an electrode (see FIGS. 4 and 5). As can be seen from Equation 13, if $r_2$ is 1300 μm, $r_1$ is 650 μm, g* is 1.5 μm, and $\theta_0$ is 0.0024 (which is a driving range required), the driving force of the second type microactuator is 2.34 times greater than that of the first type microactuator. The driving force $T_2$ of the actuator according to the present invention can be obtained from Equation 13 concerning these driving forces, as shown in Equation 14:

$$T_2 = \frac{\varepsilon_0 h V^2 (r_2^2 - r_1^2)}{2(g_f)^2} \qquad (14)$$

Referring to Equation 14, it can be seen that the driving force is generated independently of the driving range ($\theta_0$). Accordingly, a range in which an actuator can be driven while satisfying the stability can be increased, by controlling the tangent tilting angle.

As shown in FIG. 5, in a microactuator according to the present invention, a rotor 400 and a stator 300 having a tangent tilting angle expressed by Equation 10 are installed. Here, $r_1$ is the inner radius of an electrode, $r_2$ is the outer radius thereof, r* denotes an arbitrary radius which passes by an arbitrary point on an electrode starting from the center axis of rotation of the rotor, $\theta_t$ is a tangent tilting angle, and $\theta_e$ is an electrode position angle.

FIGS. 6 through 13 illustrate another embodiment of a rotary microactuator according to the present invention, wherein a rotor and a stator are zigzagged. When a rotor and a stator are zigzagged, an electrostatic attractive force (or a repulsive force) working between the rotor and the stator according to the position (radius) from a rotational axis is efficiently converted into a rotary torque, whereby the entire electrode is smoothly rotated. That is, when two electrodes are installed so that they have a continuous tangent tilting angle while the interval therebetween remains constant, as in the embodiment of FIG. 5, most of an attractive force (or repulsive force) between two electrodes works as a rotation torque on the side of the inner radius of the electrodes. However, on the side of the outer radius of the electrodes, the attractive force (or repulsive force) between two electrodes works as a repulsive force (or attractive force) rather than a rotation torque, so that it serves as a force to narrow (or widen) the interval between two electrodes. Thus, when two electrodes are formed of several pieces which are zigzagged, forces in the direction of a radial axis are offset by each other, thus solving the above problem.

Figure 6:
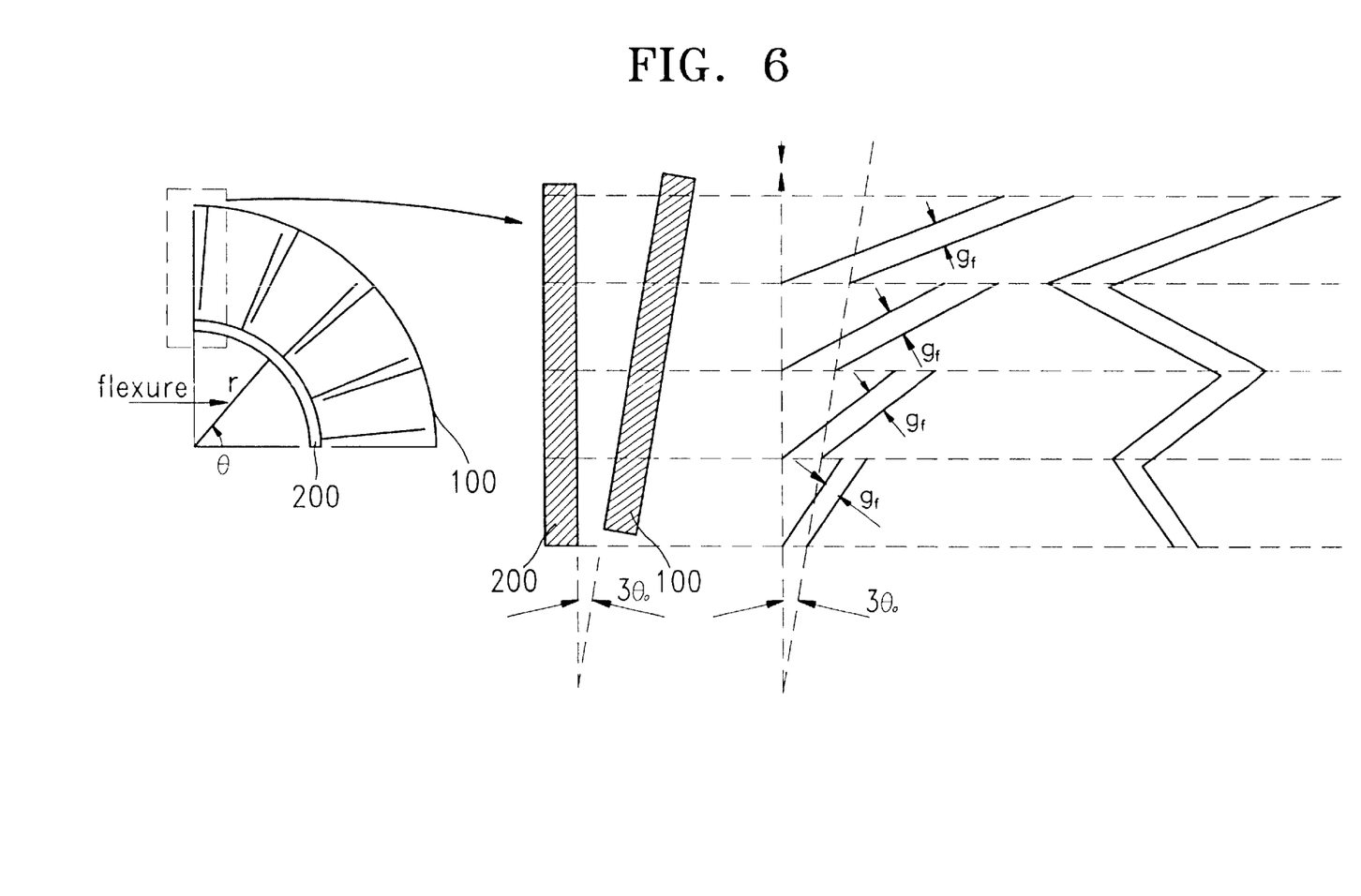
FIGS. 6 and 7 are views for explaining the manufacturing principle of a stator and a rotor of which linear pieces are zigzagged.

To be more specific, first, in order for the pieces of two linear electrodes at the same distance from the axis in the radial direction to maintain the same interval, the two electrodes must be further tilted in the direction of the outer radius of the electrodes, as shown in FIG. 6. When these pieces are zigzagged, a rotor and a stator, in which the widths of their pieces in the rotational direction increase in the direction from the inner radius of the electrodes to the outer radius of the electrodes, are formed as shown on the right side of FIG. 6.

Also, in order to make the widths of the pieces of the two zigzagged electrodes the same, the two linear electrodes must not be divided into equal pieces in the radial direction. When these pieces are zigzagged, a rotor and a stator, in which pieces have the same width in the rotational direction, are formed as shown on the right side of FIG. 7.

Figure 7:
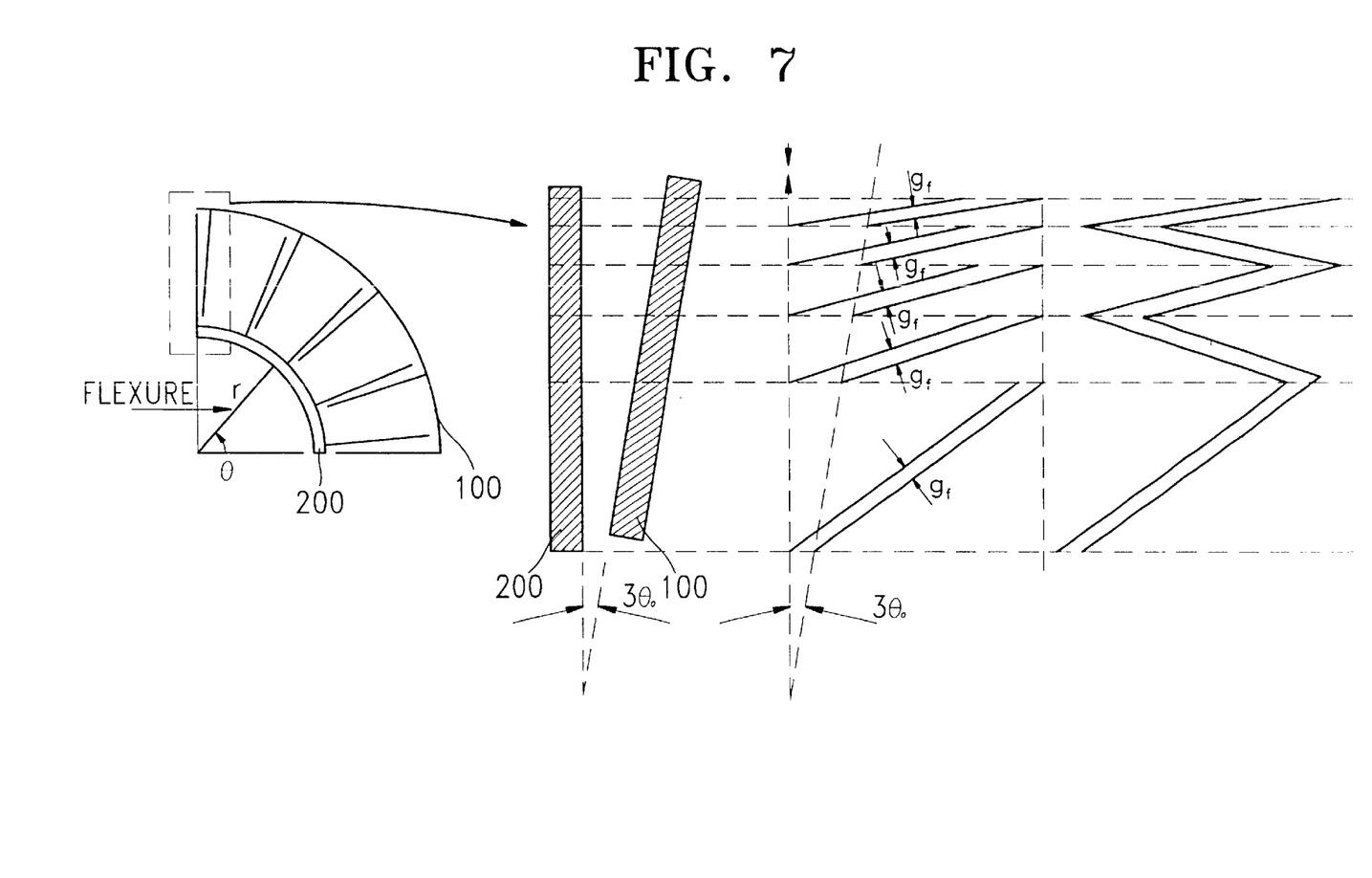
Figure 8:
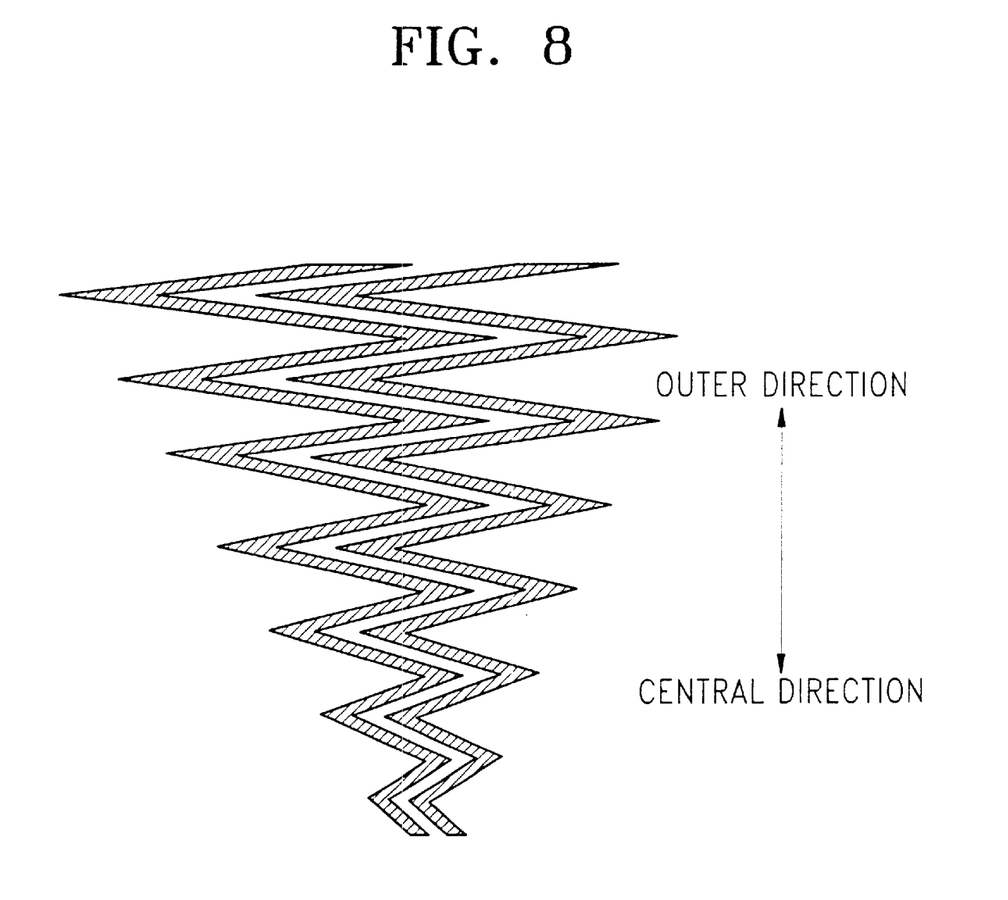
FIGS. 8 and 9 are views illustrating an embodiment of a rotor and a stator having the zigzagged linear pieces of FIGS. 6 and 7.
Figure 9:
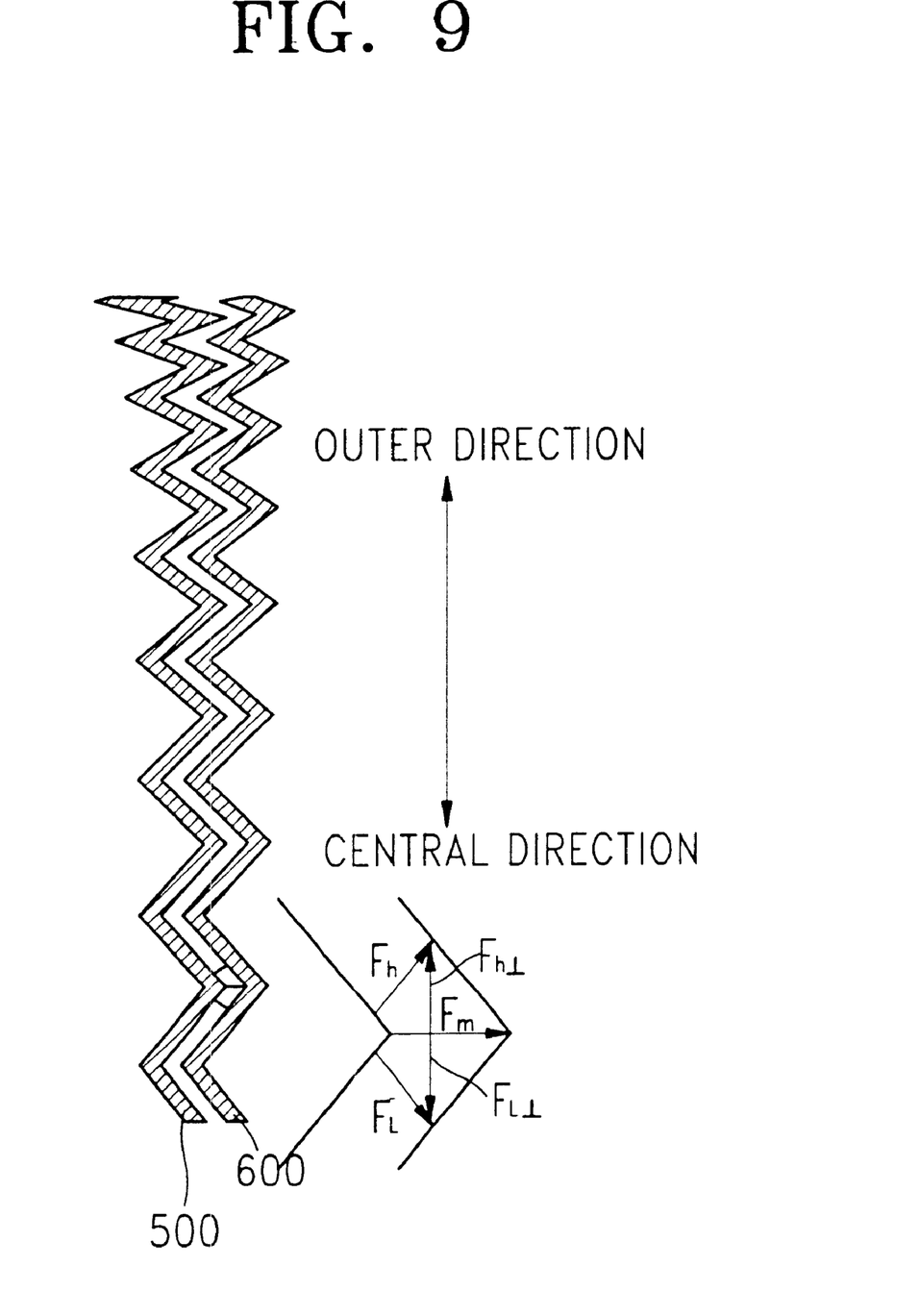

FIG. 8 illustrates a structure in which a rotor and a stator are zigzagged according to the principle shown in FIG. 6, and FIG. 9 illustrates a structure in which a rotor and a stator are zigzagged according to the principle shown in FIG. 7.

Figure 10:
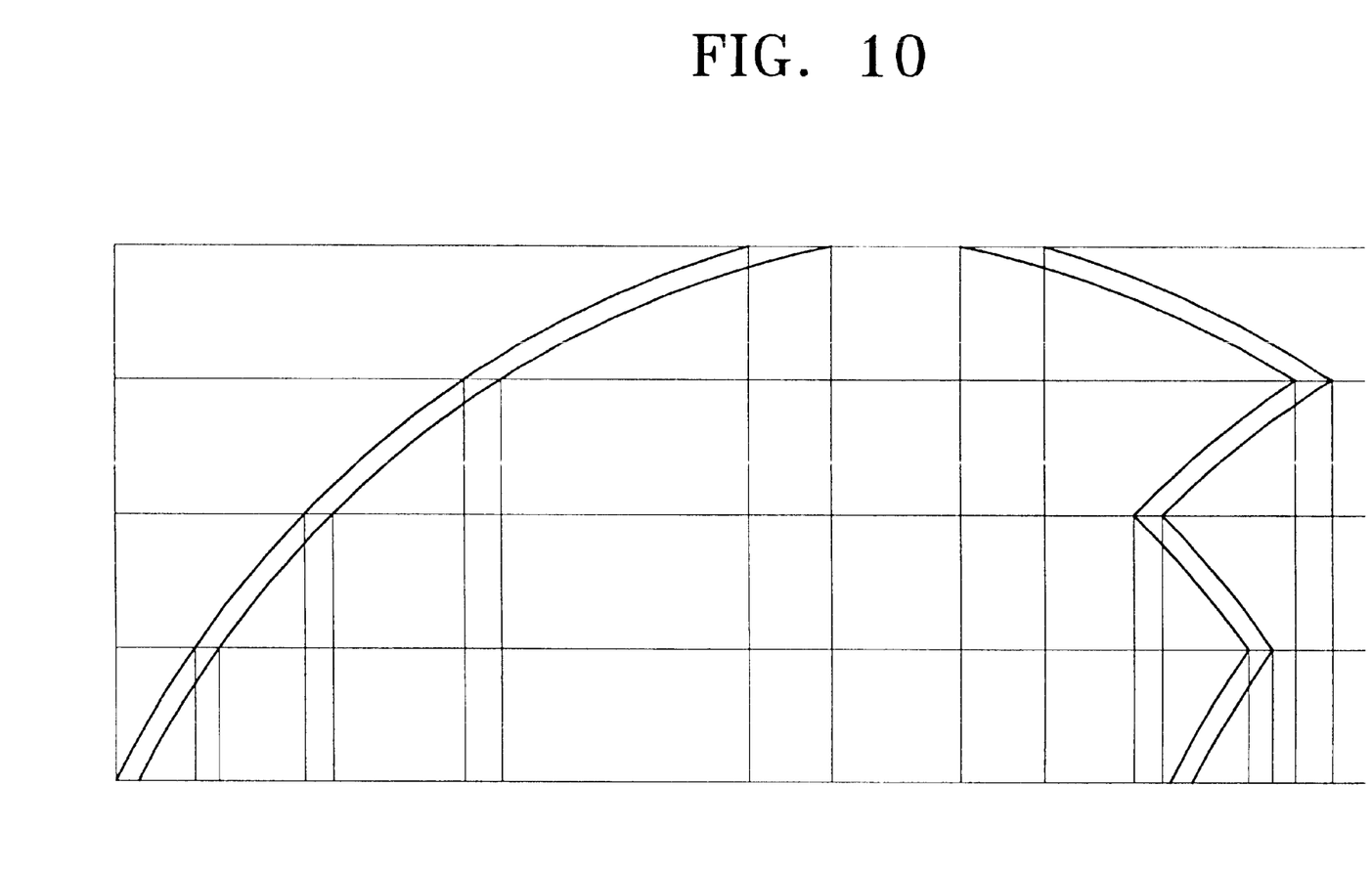
FIGS. 10 and 11 are views for explaining the principle of designing a rotor and a stator constituted of zigzagged curved pieces formed so that a tangent tilting angle with respect to the radius of an electrode continuously varies according to the radius r.

FIG. 10 illustrates a structure in which two electrodes having a tangent tilting angle which continuously varies with respect to the radius of FIG. 4 are bent in pieces at equal intervals with respect to the radius of the electrode. In this structure, two electrodes are more gently tilted with respect to the rotational direction in the direction of the outer radius of the electrode at equal intervals. When these pieces having continuous tilting angles from the central axis are zigzagged, a rotor and a stator, of which pieces are widened in the rotational direction in the direction of the outer radius of the electrode, are formed as shown on the right side of FIG. 10.

Figure 11:
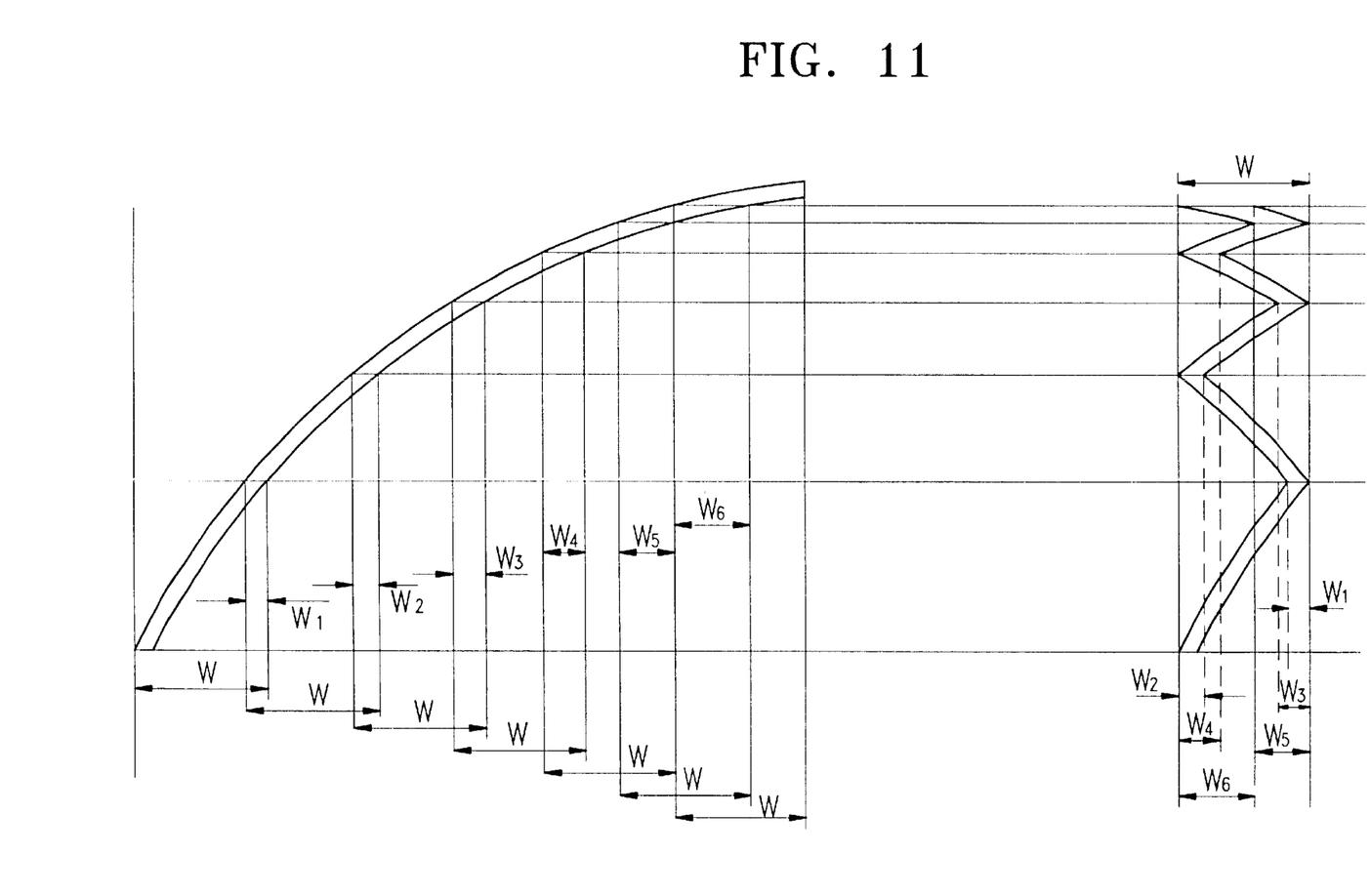

FIG. 11 illustrates a structure in which two electrodes having a tangent tilting angle which continuously varies with respect to the radius of FIG. 4 are bent in pieces such that the widths of the pieces in the rotational direction are equal. Similar to the above-described structure of FIG. 10, in this structure, two electrodes are more gently tilted with respect to the rotational direction in the direction of the outer radius of the electrode at equal intervals. When these pieces having continuous tilting angles from the central axis are zigzagged so that the widths of arrangement in the rotational direction are constant, a rotor and a stator, of which pieces are arranged to have the same width in the rotational direction regardless of the radius of the electrode, are formed as shown on the right side of FIG. 11.

Figure 12:
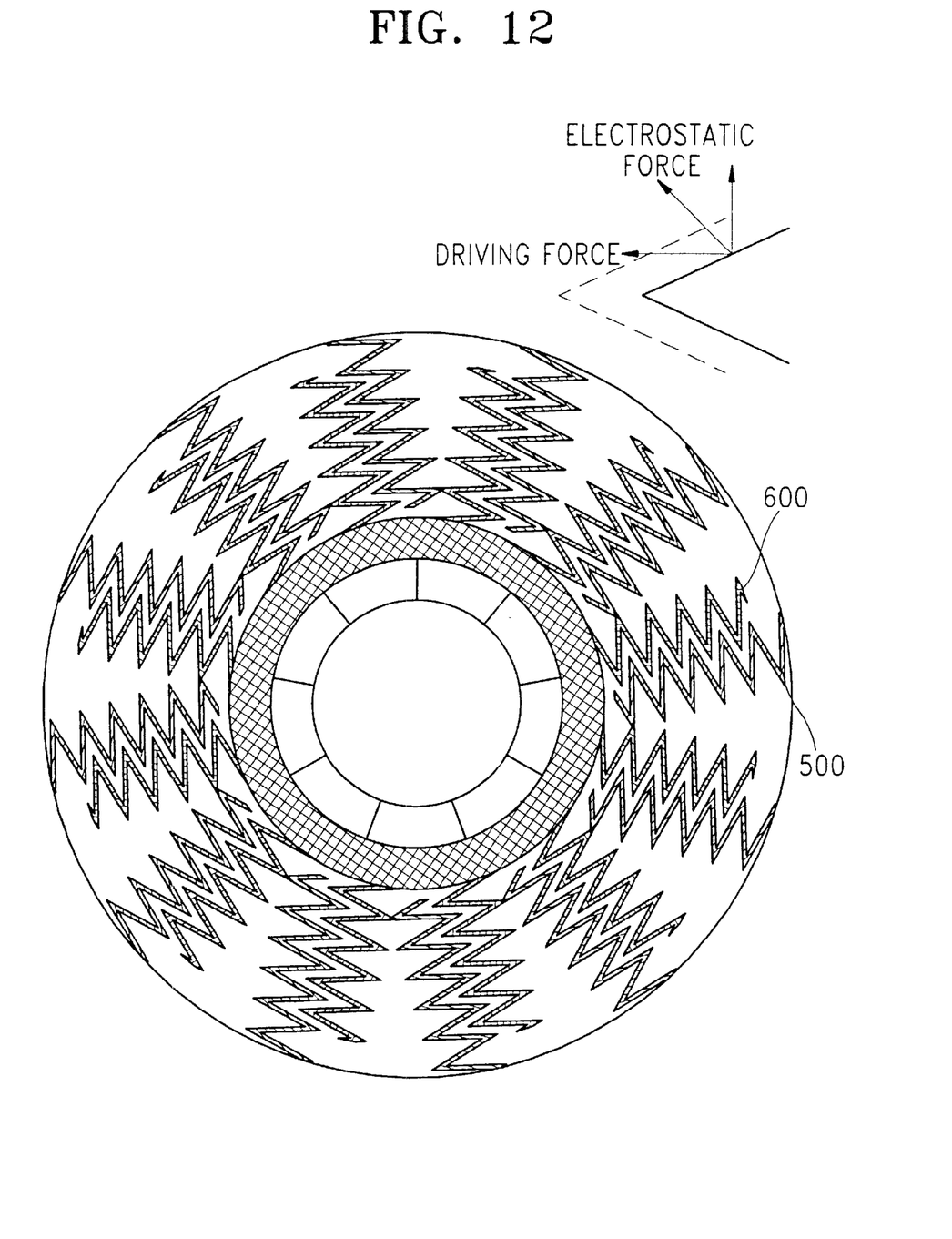
FIG. 12 illustrates a rotary microactuator on which the rotor and the stator shown in FIGS. 7 and 9 are installed.
Figure 13:
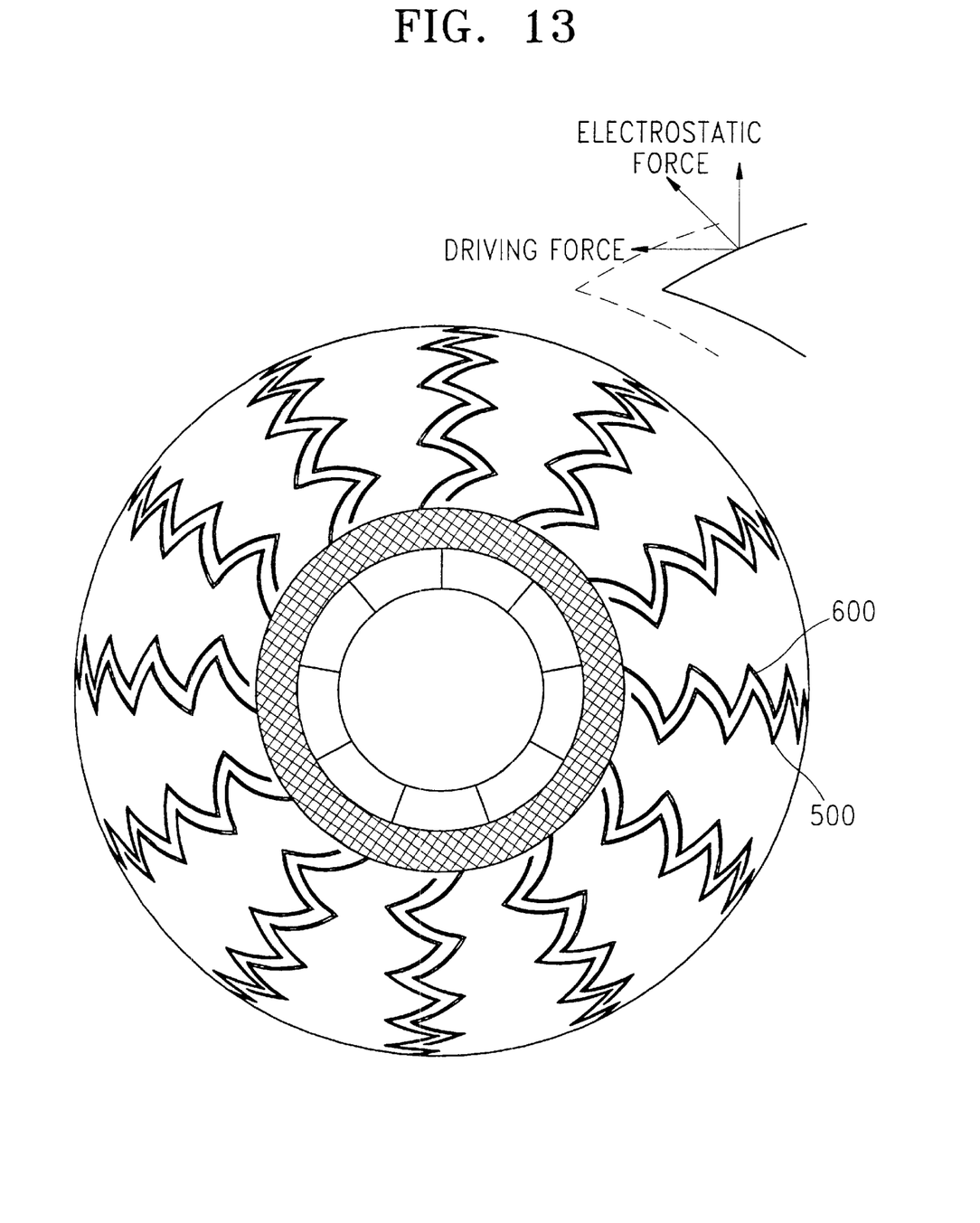
FIG. 13 illustrates a rotary microactuator on which the rotor and the stator designed by the principle of FIG. 11 are installed.

FIG. 12 illustrates an embodiment of a rotary microactuator having a rotor and a stator constituted of zigzagged linear pieces obtained according to the principle shown in FIG. 7 (FIG. 9), and FIG. 13 illustrates an embodiment of a rotary microactuator having a rotor and a stator constituted of zigzagged pieces having a continuous tilting angle obtained according to the principle shown in FIG. 11.

In these embodiments having a rotor and a stator which are zigzagged, elements working in the radial direction at adjacent pieces, among attractive forces (or repulsive forces) working between the stator 500 and the rotor 600, are offset from each other ($F_L\perp + F_H\perp = 0$), so that only an element (Fm) in the rotation direction acts as a rotation torque. Thus, more efficient and smooth rotation is achieved (see FIG. 9).

As described above, a rotary microactuator according to the present invention is manufactured by continuously tilting electrodes, which is a rotor and a stator, as expressed in Equation 10 so that the interval between electrodes is constantly maintained to a minimum interval obtained by a process regardless of the radius from the center of rotation, so that a maximum driving force per given parallel-plate area can be generated. Also, the vertical intervals between electrodes is designed to be the same, so that a manufacturing process is easy. Since a driving force is generated regardless of a driving range required between the rotor and the stator, the rotary microactuator according to the present invention is not limited by the driving range, in contrast to an existing microactuator in which a great driving force can be obtained only when the driving distance is narrow. Therefore, linearity can be increased. In the case of wrinkled electrodes, deformation of the electrodes can be reduced.

What is claimed is

1. A rotary microactuator including a rotor and a stator as two electrodes for driving rotation, wherein the rotor and the stator have a tangent tilting angle which continuously varies according to a radius from the central axis of the rotor so that the interval between the rotor and the stator in the normal direction to the curvature of the rotor and stator is constant regardless of a radius from the central axis of the rotor, wherein in the manufacture of pieces from the zigzagged rotor and the zigzagged stator, when the minimum interval between the two electrodes that can be obtained by a process is set to be $g_f$, a driving angle required by the actuator is set to be $\theta_0$, a factor for satisfying the static stability of the two electrodes within an electrical field is set to be n, and the radius is set to be r, the tangent tilting angle $\theta_t(r, g_f)$ with respect to the axis of the radius r is expressed as in the following Equation:

$$\theta_t(r, g_f) = \cos^{-1}\left(\frac{g_f}{nr\theta_0}\right).$$

2. The rotary microactuator of claim 1, wherein an electrode position angle $\theta_e(r^*)$ formed by the axis of an electrode position radius $r^*$ from the axis of the inner radius $r_1$ at which an electrode begins is expressed as in the following Equation:

$$\theta_e(r^*) = \int_{r_1}^{r^*} \frac{\tan\left(\cos^{-1}\left(\frac{g_f}{nr\theta_0}\right)\right)}{r} dr$$

wherein $g_f$ denotes the minimum interval between the two electrodes that can be obtained in the manufacture of the rotor and the stator, n denotes a factor for satisfying the static stability of the two electrodes within an electrical field, $r_1$ denotes the inner radius of the rotor, which is the distance to the innermost portions of the two electrodes, $r_2$ denotes the outer radius of the rotor, which is the distance to the outermost portions of the two electrodes, $\theta_0$ denotes a driving angle required by the actuator between the inner radius and the outer radius, and $r^*$ denotes an electrode position radius from the central axis of the rotor to an arbitrary point on each of the two electrodes within the required driving angle $\theta_0$.

3. A rotary microactuator including a rotor and a stator as two electrodes for driving rotation, wherein the rotor and the stator have a zigzag shape so that the interval between the rotor and the stator in the normal direction is constant regardless of a distance from the central axis of the rotor 4, wherein each zigzagged piece of the rotor and the stator has a continuous tilting angle along the radius from the central axis of the rotor, wherein in the manufacture of pieces from the zigzagged rotor and the zigzagged stator, when the minimum interval between the two electrodes that can be obtained by a process is set to be $g_f$, a driving angle required by the actuator is set to be $\theta_0$, a factor for satisfying the static stability of the two electrodes within an electrical field is set to be n, and the radius is set to be r, the tangent tilting angle $\theta_t(r,g_f)$ with respect to the axis of the radius r is expressed as in the following Equation:

$$\theta_t(r, g_f) = \cos^{-1}\left(\frac{g_f}{nr\theta_0}\right).$$

4. The rotary microactuator of claim 3, wherein the rotor and the stator are zigzagged into pieces in which the radii of the rotor and the stator are divided at regular intervals.

5. A rotary microactuator including a rotor and a stator as two electrodes for driving rotation, wherein the rotor and the stator have a zigzag shape so that the interval between the rotor and the stator in the normal direction is constant regardless of a distance from the central axis of the rotor, wherein the rotor and the stator are zigzagged more sharply in the direction of the outer radius of the rotor, so that the width of each piece in the circumferential direction is constant.

6. The rotary microactuator of claim 5, wherein the rotor and the stator are zigzagged into pieces in which the radii of the rotor and the stator are divided at regular intervals.

7. The rotary microactuator of claim 5, wherein each zigzagged piece of the rotor and the stator has a continuous tilting angle along the radius from the central axis of the rotor.

8. The rotary microactuator of claim 7, wherein in the manufacture of pieces from the zigzagged rotor and the zigzagged stator, when the minimum interval between the two electrodes that can be obtained by a process is set to be $g_f$, a driving angle required by the actuator is set to be $\theta_0$, a factor for satisfying the static stability of the two electrodes within an electrical field is set to be n, and the radius is set to be r, the tangent tilting angle $\theta_t(r,g_f)$ with respect to the axis of the radius r is expressed as in the following Equation:

$$\theta_t(r, g_f) = \cos^{-1}\left(\frac{g_f}{nr\theta_0}\right).$$

* * * * *